Jan. 12, 1926.  
J. W. SEEGER  
ANTISKID DEVICE FOR AUTOS  
Filed Feb. 18, 1925  
1,569,790
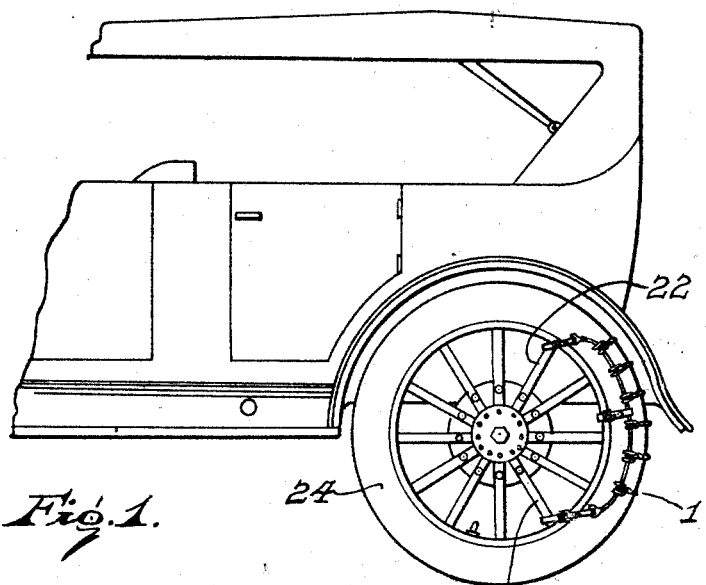
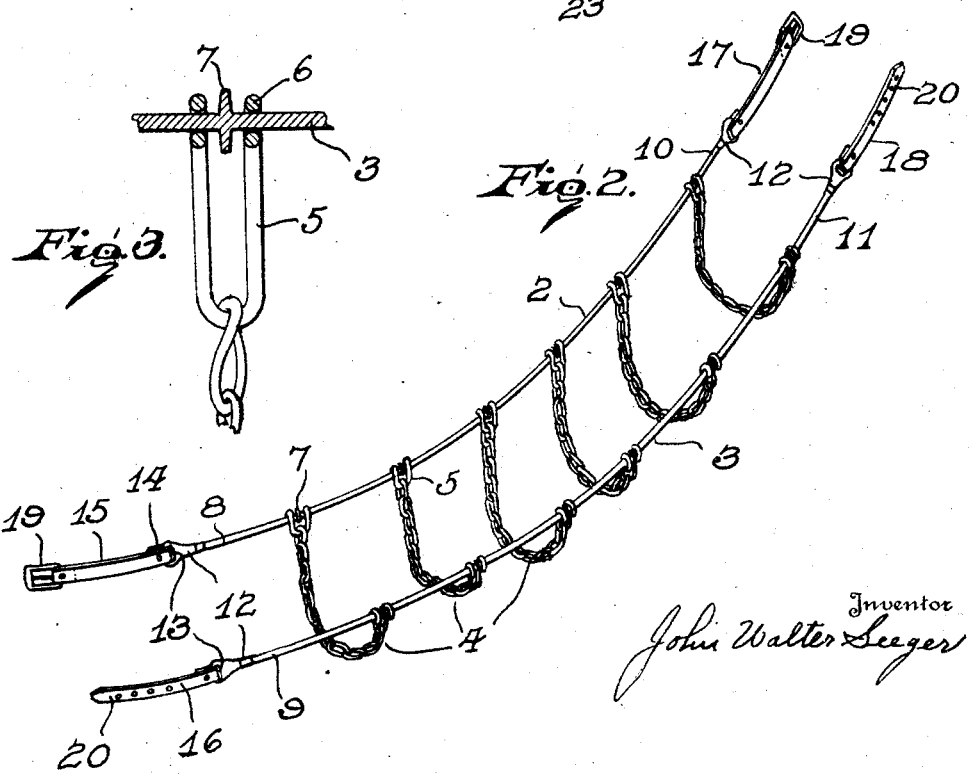

Patented Jan. 12, 1926.

1,569,790

UNITED STATES PATENT OFFICE.

JOHN WALTER SEEGER, OF WASHINGTON, DISTRICT OF COLUMBIA, ASSIGNOR TO SEEGER CHAIN COMPANY, INCORPORATED, OF WASHINGTON, DISTRICT OF COLUMBIA, A CORPORATION OF DELAWARE.

ANTISKID DEVICE FOR AUTOS.

Application filed February 18, 1925. Serial No. 10,012.

*To all whom it may concern:*

Be it known that I, JOHN WALTER SEEGER, a citizen of the United States, residing at Washington, in the District of Columbia, have invented certain new and useful Improvements in Anti-Skid Devices for Autos, of which the following is a specification.

This invention relates to improvements in anti-skid devices, and has for its object to provide such a device which may be quickly attached to an automobile tire, regardless of the position of the wheel.

Another object of the invention is to provide an anti-skid device extending only partially around the tire and means whereby the device may be securely attached to the wheel.

With the above and other objects in view, I have invented the device illustrated in the accompanying drawings, in which:

Figure 1 is an elevational view of an automobile partially broken away and embracing my invention.

Figure 2 is a perspective view of my anti-skid device, and

Figure 3 is a detail sectional view illustrating a chain fastening means.

Like reference characters indicate like parts throughout the following specification and in the several views in the drawings, in which 1 indicates an anti-skid device embracing a pair of spaced apart parallel cables 2 and 3 connected by spaced apart transverse anti-skid chains 4, the terminal link 5 of each of which consists of a U-shaped member having its terminals formed into eyes 6 coiled around the cables 2 and 3. Fixedly secured to said cables between the eyes of each of said links 5 are collars 7 fixedly secured to the respective cables, whereby the spaced apart position of the chains 4 are maintained.

Each end 8, 9, 10 and 11 respectively of the cables 2 and 3 terminate in swivels 12 provided with transversely disposed elongated eyes 13, to which are secured the loops 14 of the straps 15, 16, 17 and 18, the straps 15 and 17 having buckles 19 to receive the ends 20 of the other of said straps, and whereby the device may be secured as illustrated in Figure 1 to the spokes 22 and 23 of the wheel 24.

From the above description, it will be noted that I have provided an anti-skid device which may be securely attached to a wheel, regardless of the position of the wheel, and without the necessity of moving said wheel. I have found through long experience that in many cases, such as in snow banks, mud holes, etc., it is impossible to mount the common form of tire chain upon a wheel, because of its position. Therefore, the use of such chains, after the tire has become embedded in mud, snow, etc., is impractical. However, with my device, it may be attached to the exposed part of the wheel quickly and therefore will at once force the car out of its stuck position.

Having described my invention, that which I claim to be new and desire to secure by Letters Patent is:

1. An anti-skid device for pneumatic tires consisting of a pair of flexible cables each having at spaced intervals a series of projections, cross-chains connecting these cables, the end-links of these cross-chains being pivotally connected to the cables in straddling relation to the projections, and means at the ends of the cables for fastening the appliance to a wheel.

2. An anti-skid device for pneumatic tires consisting of a pair of flexible cables each having at spaced intervals a series of projections, cross-chains connecting these cables, the end-links of these cross-chains being pivotally connected to the cables in straddling relation to the projections, and means at the ends of the cables for fastening the appliance to a wheel, said projections being circular in form and being rigidly affixed to the cables.

In testimony whereof I affix my signature.

JOHN WALTER SEEGER.